United States Patent [19]

Hasfjord

[11] 3,987,525

[45] Oct. 26, 1976

[54] ROTARY CUTTER

[75] Inventor: Morten Birger Hasfjord, Odeshog, Sweden

[73] Assignee: E.G. Larssons Hardmetall AB, Norrkoping, Sweden

[22] Filed: Sept. 30, 1975

[21] Appl. No.: 618,156

[52] U.S. Cl. ............................................. 29/105 R
[51] Int. Cl.² ......................................... B26D 1/12
[58] Field of Search .................................. 29/105 R

[56] References Cited

UNITED STATES PATENTS

| | | | |
|---|---|---|---|
| 1,207,735 | 12/1916 | Ford | 29/105 R |
| 1,342,535 | 6/1920 | Eden, Jr. | 29/105 R |
| 1,365,180 | 1/1921 | McDonald | 29/105 R |
| 1,736,210 | 11/1929 | Miller | 29/105 R |
| 2,264,299 | 12/1941 | Crosby | 29/105 R |
| 2,660,242 | 11/1953 | Lane | 29/105 R |
| 2,862,286 | 12/1958 | Williams | 29/105 R |
| 2,920,896 | 1/1960 | Buck | 29/105 R |

FOREIGN PATENTS OR APPLICATIONS

| | | | |
|---|---|---|---|
| 919,599 | 12/1946 | France | 29/105 R |

*Primary Examiner*—Harrison L. Hinson
*Attorney, Agent, or Firm*—Pierce, Scheffler & Parker

[57] ABSTRACT

A rotary cutter body has at least one recess, adjacent its periphery, in which there is loosely received a cutting insert the cutting edge of which is parallel with the rotary axis of the cutter body. The insert is held in fixed position in the recess by a cylindrical locking pin having thereon a plane surface engageable with a plane surface within a recess in the insert so as to wedge the insert between abutment surfaces of the recess in said cutter body.

4 Claims, 9 Drawing Figures

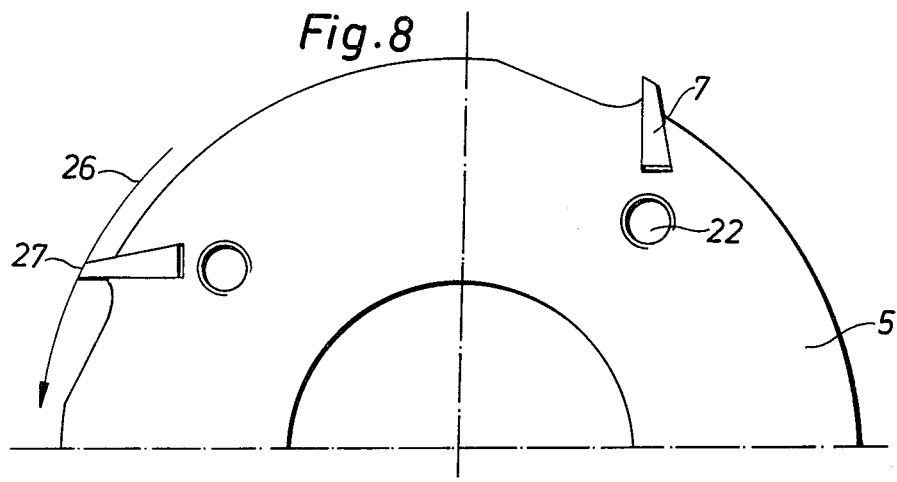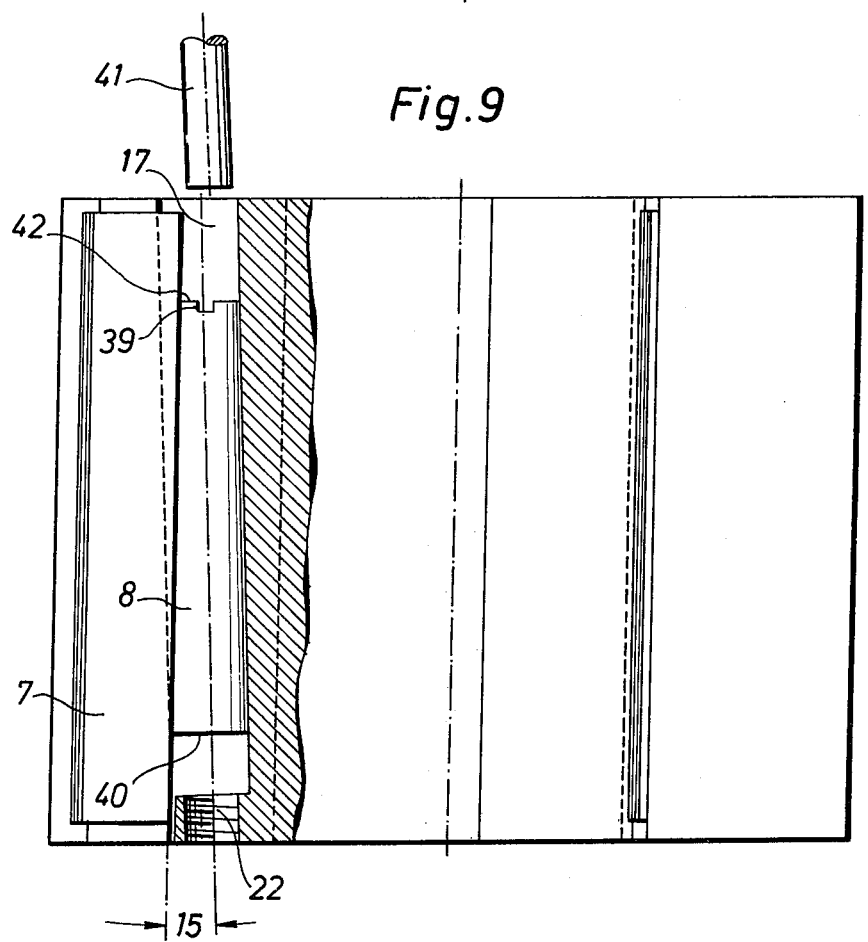

ROTARY CUTTER

The present invention relates to a rotary cutter comprising a cutter body with at least one cutting insert loosely received in a recess near the periphery of said cutter body, the cutting edge of said cutting insert extending mainly parallel with the rotary axis of said cutter body, said cutting insert being kept in fixed position between and in contact with two plain abutment surfaces which, as seen in a sectional plane perpendicular to the axis of the cutter body, are wedgelike and narrowing outwardly of the cutter body.

It heretofore has been proposed to use new types of materials and processes in connection with wood working industry. In the working of materials such as board, plywood, laminates and different plastics there is a high demand for edge resistance of the cutting elements in use. The consequence thereof has been increased use of cutting elements made of cemented carbide. Even in other types of materials, such as mahogany, gabbon, teak, etc. there is severe abrading of cutting tools in use.

A principal object of the present invention is to provide a rotary cutter that enables lowering costs of cutting tools in planing-machines in which a plurality of cutters are used. The invention is applicable to cutting inserts made of cemented carbide or high-speed steel or other tool steel.

For this purpose I provide a rotary cutter of the aforementioned type which is mainly characterized in that the fixation of the insert between said wedgelike abutment surfaces is accomplished by means of a cylindrical locking pin, said pin being provided with a plain surface formed at an angle to the axis of the pin and received in a recess located radially inside the insert, said recess being oriented in the cutter body at an angle to the axis of the cutter body equal to the angle between said plain surface and the axis of said pin, so that, when urging said pin into the cutter body, said plain surface thereon is brought into plain surface abutment with a plain end surface of the insert, thus causing wedging enagement of the insert between said fixed abutment surfaces.

The invention hereinafter is described in more detail, with reference to the accompanying drawings, in which:

FIG. 8 is an end view of another embodiment of a rotary cutter of the invention; and FIG. 9 is an axial sectional view of the cutter shown in FIG. 8.

Figure 1:
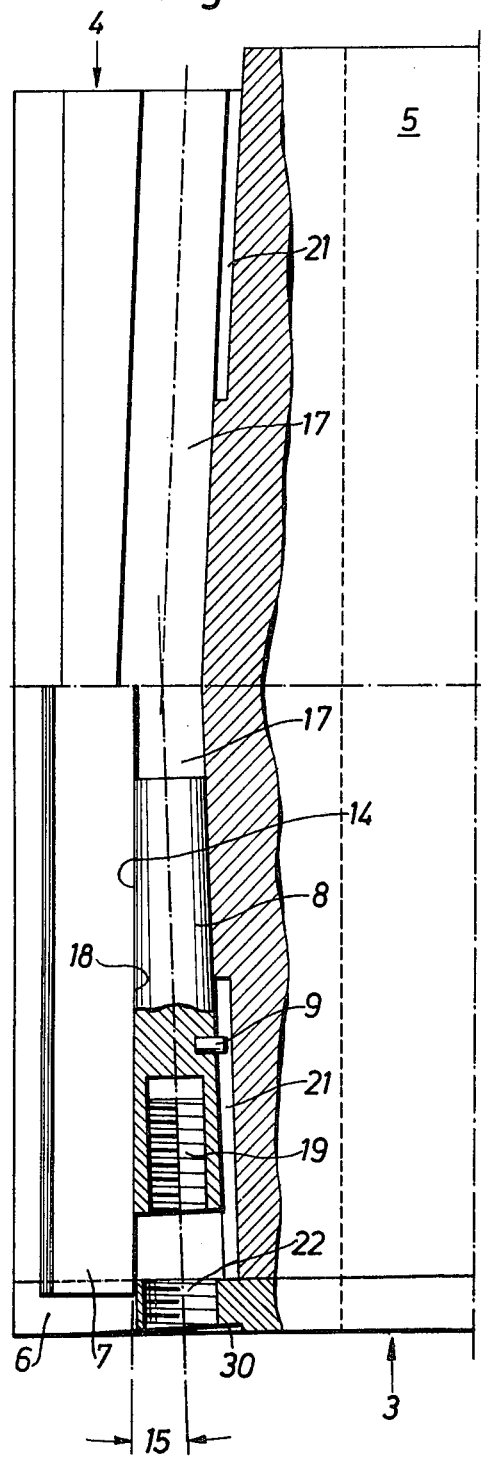
FIG. 1 is an axial sectional view along the line 1—1 in FIG. 2, as seen in direction of arrow 2.
Figure 2:
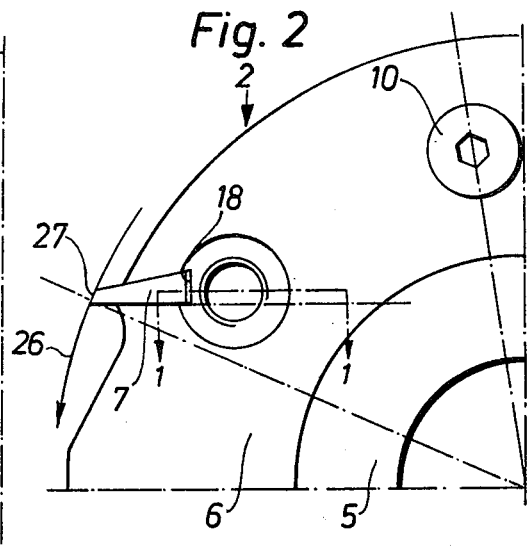
FIG. 2 is an end view of a rotary cutter, as seen in direction of arrow 3 in FIG. 1.
Figure 3:
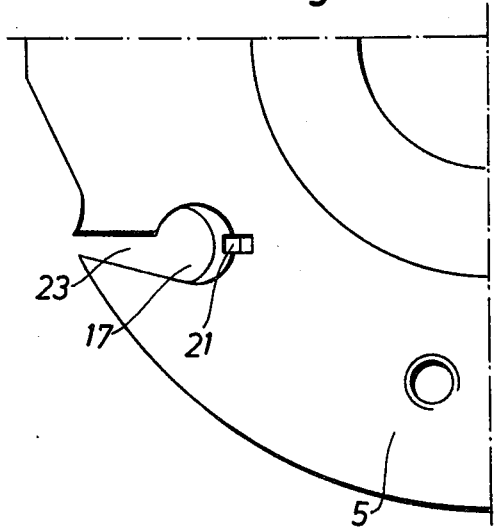
FIG. 3 is an end view of the cutter as seen in direction of arrow 4 in FIG. 1.
Figure 4:
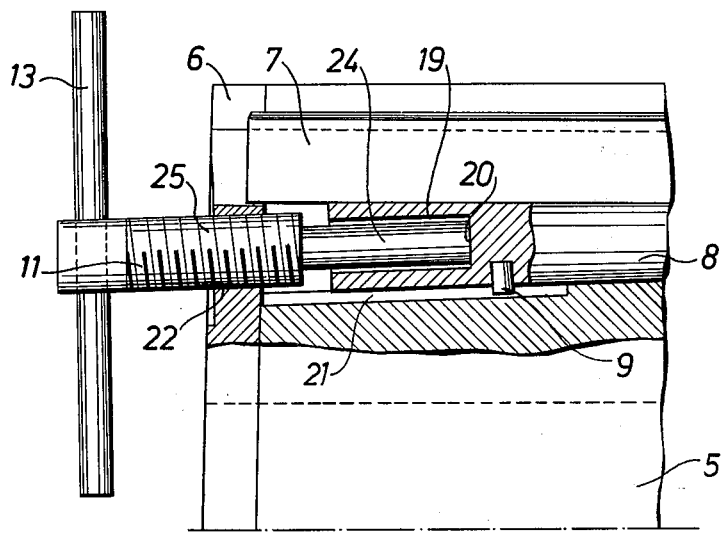
FIG. 4 is an axial sectional view of a rotary cutter and an appertaining assembling tool.

The rotary cutter according to FIGS. 1–7 comprises a cutter body 5, end flanges 6, cutting inserts 7, wedging elements 8, positioning members 9 and screws 10 for securing said end flanges to the cutter body. The rotary cutter embodiment according to FIGS. 8–9 is only different therefrom in that it lacks said end flanges.

Figure 5:
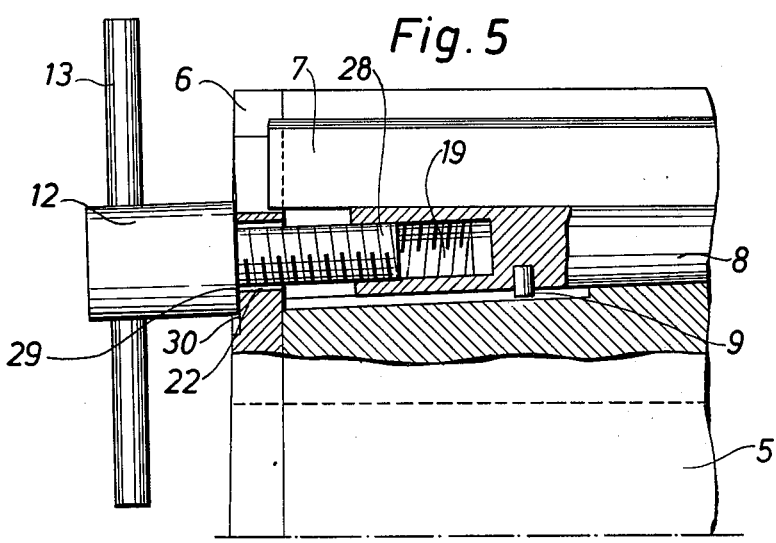
FIG. 5 is an axial sectional view of said cutter and an appertaining disassembling tool.
Figure 6:
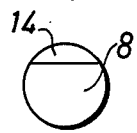
FIG. 6 is an end view of a cylindric locking pin for the fastening of the cutting inserts.
Figure 7:
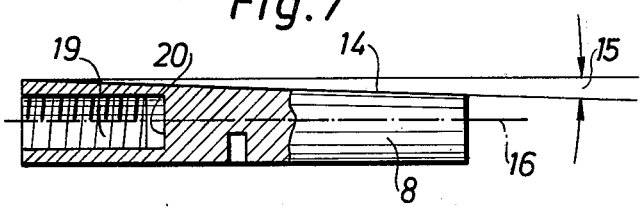
FIG. 7 is an axial sectional view of the locking pin in FIG. 6.

As appears from FIGS. 5 and 6, the wedging element is configured as a cylindrical pin 8 with a plain bevel surface 14 provided on its mantle surface. The center line of said bevel surface 14 forms a slight angle 15 with the center line 16 of said pin 8. Bores 17 are provided in the cutter body for the receipt of said wedging pins 8 axially oriented at the same said angle 15 to the axis of the cutter body. Each wedge pin is also provided with an interiorly threaded portion 19 terminated by a bottom surface 20 at right angle to the axis of said pin. Further, a co-operating threaded portion is provided on the pin, where it enters into the least bevelled end surface thereof.

A positioning member 9 is associated with each said pin 8 as a protrusion thereon and received with loose engagement in a wedge slot 21 such that each said bevel surface 14 on each said pin extends perfectly in the axial direction of the cutter body. After the wedge pins 8 have been inserted into their bores 17 as described above, the end flanges 6 are secured to the cutter body 5 by means of screws 10. Each said flange 6 is provided with threaded holes 22 coaxial with said pin-receiving bores 17. There is such relative dimensioning that a screw is able threadedly to engage with threaded portion 19, while no similar engagement occurs in threaded hole 22.

Both end flanges 6 and cutter body 5 are provided with similar coaxial recesses 23 for the receipt of cutting inserts 7. Each said recess 23 comprises two plain surfaces which, as seen in a sectional plane perpendicular to the axis of the cutter body, are wedgelike and narrowing outwardly of the cutter body, against which surfaces the insert is arranged to rest. This arrangement ensures that each cutting insert is incapable of radially moving out from the cutter body. Each said recess 23 enters into the pin-receiving bore 17 of the cutter body.

After the wedge pins 8 and the end flanges 6 have thus been secured to the cutter body 5, the inserts are located into their recesses 23. The assembling tool 11 comprises a rod portion 24 of such dimension that it freely passes interiorly of threaded portion 19 and abuts against bottom surface 20. The assembling tool also comprises another rod portion 25 that is threaded for engagement with the threaded hole 22 in the flange. If, now, said tool is turned in clock-wise direction it will move into the wedge pin 8 and urge it into the cutter body. Due to the inclination provided between the wedge pin and the axis of the cutter body the plain bevelled surface 14 of the pin is caused to take plain abutment against the plain end surface 18 of the cutting insert, thus urging the insert outwardly of the cutter body. In-screwing of said tool 11 is continued until the insert 7 is safely secured in place. Then the assembling tool 11 is removed therefrom. All inserts are secured into their recesses in the cutter body with same tool 11 as described above.

By arranging the wedge pins at an inclination 15 considerably smaller than the frictional angle, the pin will be self-locking. Due to this arrangement there is no risk that said pin will move back against the aforesaid end flanges. The centrifugal force also is of such direction that an increased inter-locking is obtained.

After the inserts have thus been firmly secured in their recesses, they are all subjected to a grinding precedure on peripheral surface 27. This means that equal cutting circles 26 are reached for the inserts which results in perfect circular round-work. When the inserts have been worn down to a certain extent they are re-ground and then used again. This procedure is repeated until the part of the inserts that protrudes beyond the mantle surface of the cutter body has been wholly worn down. When the inserts have been wholly worn down or damaged they are removed from the cutter body as illustrated in FIG. 5. The disassembling tool is indicated at 12 and comprises a threaded end portion 28 that is capable of threadably engaging with threaded portion 19 of the wedge pin whereas same threaded portion 28 passes freely through the threaded hole 22 in the end flange 6. When portion 28 has been inscrewed a few turns into portion 19 a shoulder 29 on said tool 12 abuts against a corresponding abutment surface 30 recessed in the end flange 6. Upon continued in-screwing of said portion 28 in clock-wise direction the wedge pin 8 is caused to move against said flange. The pressure between surfaces 14 and 18 ceases. The insert is then removed axially out of the cutter body by slightly beating against the insert with a suitable tool.

While in FIG. 1 only one insert and one end flange have been shown assembled to the cutter body, it is to be understood that a similar assembly is provided on the opposite side of the cutter body.

In the foregoing description the cutter body has been equal and symmetrical about the line indicated 31 in FIG. 1. At the same time as each insert is caused to move radially outwardly each wedge pin will also urge both inserts against each other at their end surfaces coinciding with said line 31 in FIG. 1. This is advantageous. In this connection it is suitable to let both said inserts abut axially at some distance from said line 31, whereas the next pair of inserts, in the rotary direction, may abut at some distance opposite said line 31, thus avoiding marking in the work-piece with which the cutter engages.

In FIGS. 8–9, there is shown another embodiment of the invention suitable for cutters of small widths. In those cases it is sufficient to use merely one wedge pin and one insert as seen in a section corresponding to FIG. 1. This embodiment is different (from that shown in FIGS. 1–7) in that it has a threaded hole 22 for the assembling tool provided in the cutter body because of the lack of a separate end flange. The wedge pin 8 is inserted into its recess from the opposite side of the cutter body. Also, it is now possible to use wedge pins of simpler designs. They need no interiorly provided thread portions; instead, they exhibit a chisel slot 39 at their ends. Neither is it necessary, due to said slot 39, to provide them with any positioning members 9 such as has been shown in FIG. 1. The assembling tool 11 may be applied directly on the end surface 40 of the wedge pin 8. The disassembling tool may consist of a cylindrical mandrel 41 of such dimension that it passes into the bore 17 without touching or pressing on the insert 7. By placing said mandrel in abutment with end surface 42 of the wedge pin and then beating on the mandrel the wedge pin is urged inwardly thus relieving the pressure applied on the insert. The insert may then be removed axially quite simply from its recess.

The invention provides essential advantages owing to its simple construction. As appears from the figures, there is no use of any threaded bores on the peripheral surface of the cutter body. This eliminates problems with gum and resin that otherwise usually will penetrate such bores when the cutter is working in soft materials such as wood, board, etc. Another advantage is that there is a considerably lower noise level associated with cutters according to the invention because of the lack of peripherally provided bores.

I claim:
1. A rotary cutter comprising
   a cutter body (6) having a plurality of spaced slots around the periphery thereof, each said slot comprising a recess (23) defined by two outwardly tapering walls that extend in planes parallel to the axis of rotation of said cutter,
   said recess being widened into a cylindrically recessed portion (17) the axis of which forms an angle with said axis of rotation;
   a plurality of cutting inserts (7) loosely mounted in said recesses (23),
   each said insert having a straight-line peripheral cutting edge parallel to said axis of rotation and converging side surfaces in abutment with the tapering walls of said recesses,
   each said insert having a plane surface (18) remote from said cutting edge constituting a radial abutment surface the longitudinal edges of which extend parallel to said axis of rotation;
   a plurality of cylindrical locking pins (8) located in said cylindrically recessed portions (17) radially inside the inserts,
   each said pin being provided with a plane bevelled surface (14) formed at an angle to the axis of the pin equal to said prior angle between the axis of recessed portion (17) and said axis of rotation,
   said plane bevelled surface (14) being arranged in plane surface abutment with said radial abutment surface (18) of the insert.

2. A rotary cutter as defined in claim 1, according to which the cutter body is provided with threaded holes (22) coaxial with the pin-receiving recesses (17) for the receipt of an assembling tool adapted to threadably engage with said hole (22) and cause inward pressure on said pin.

3. A rotary cutter as defined in claim 1, wherein the cutter body is provided with two annular end flanges (6) on opposite sides thereof, said flanges being provided with recesses similar to and coaxial with said insert-receiving recesses (23), and said threaded holes (22) for the receipt of the assembling tool being provided in the end flanges.

4. A rotary cutter as defined in claim 1, according to which the locking pin (8) is interiorly provided with a threaded portion (19) for the receipt of a disassembling tool provided with a mating thread.

* * * * *